Oct. 9, 1934.  A. F. BREITENSTEIN  1,976,476
CHASER CUTTING MECHANISM
Filed Jan. 28, 1933  5 Sheets-Sheet 1
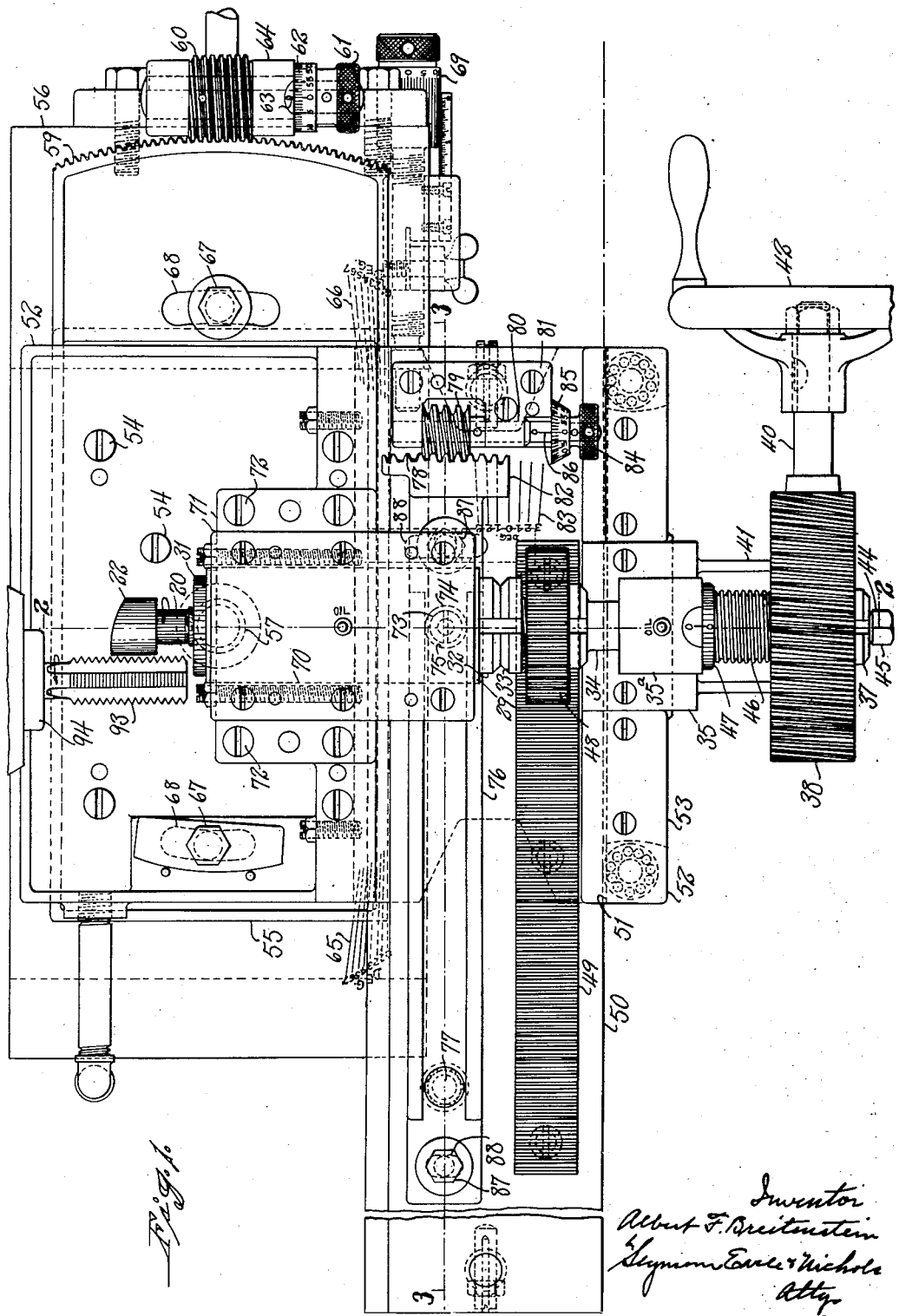

Oct. 9, 1934.   A. F. BREITENSTEIN   1,976,476
CHASER CUTTING MECHANISM
Filed Jan. 28, 1933   5 Sheets-Sheet 2
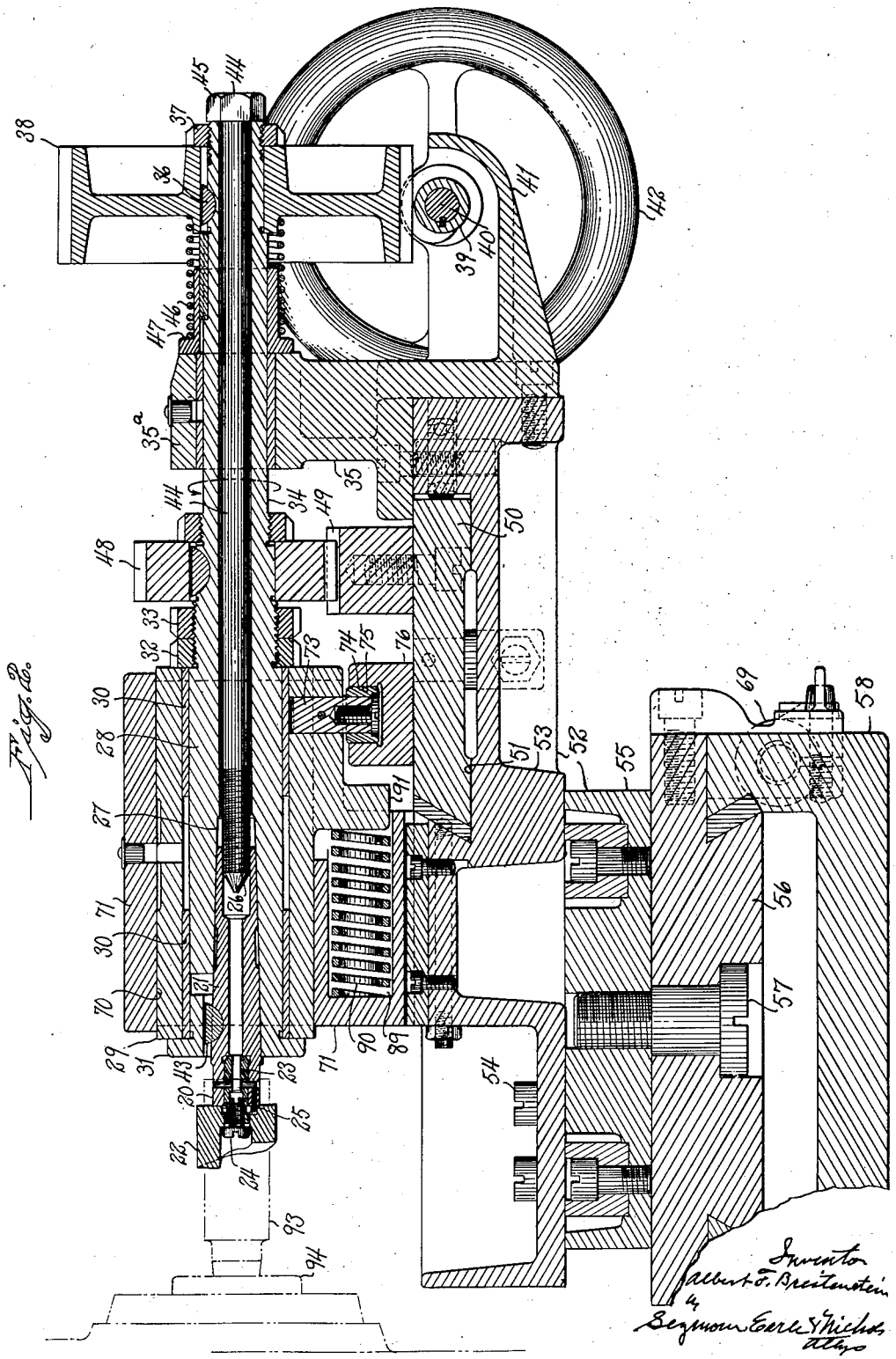

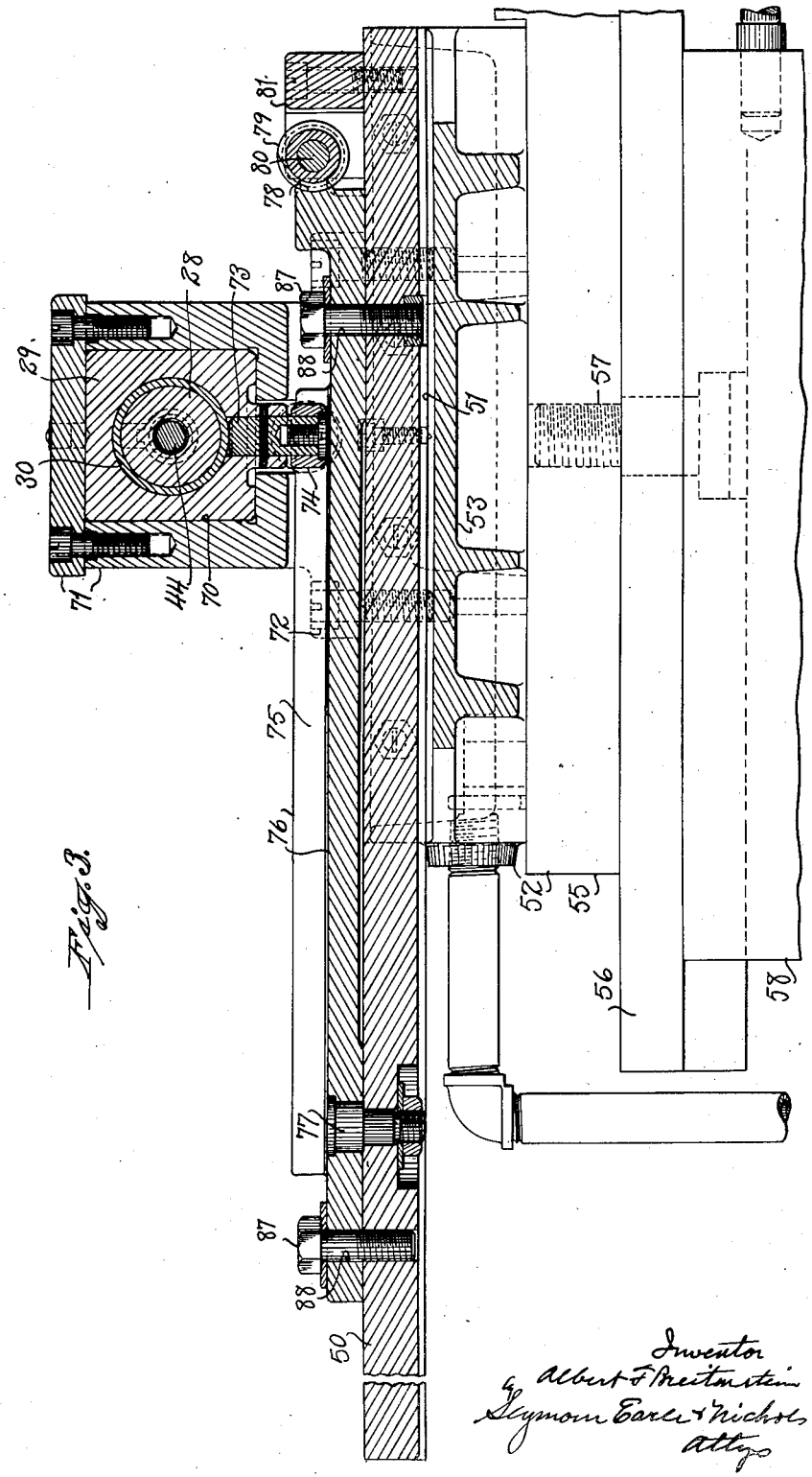

Oct. 9, 1934.  A. F. BREITENSTEIN  1,976,476
CHASER CUTTING MECHANISM
Filed Jan. 28, 1933   5 Sheets-Sheet 4
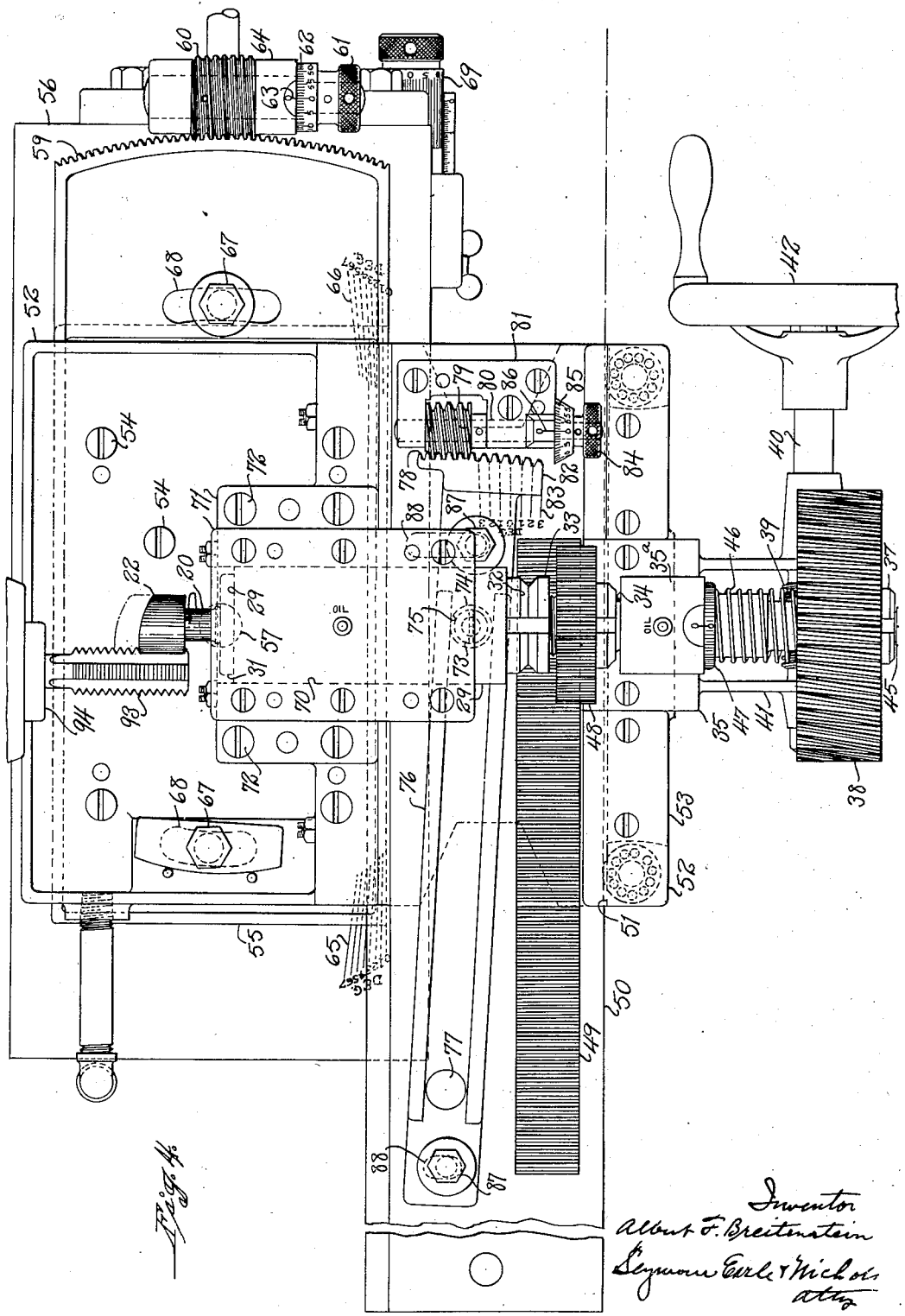

Oct. 9, 1934.　　A. F. BREITENSTEIN　　1,976,476
CHASER CUTTING MECHANISM
Filed Jan. 28, 1933　　5 Sheets-Sheet 5
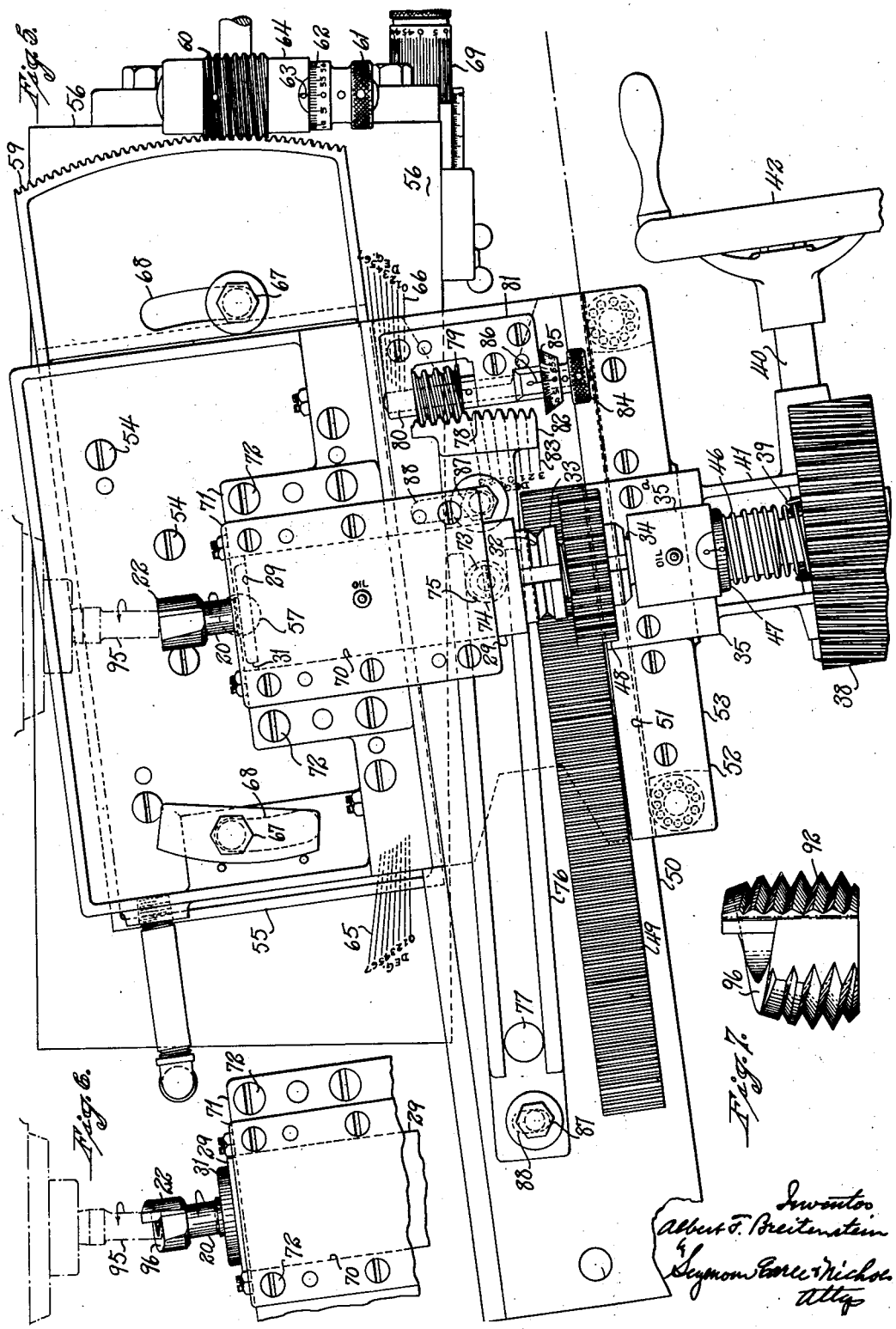

Patented Oct. 9, 1934

1,976,476

UNITED STATES PATENT OFFICE 1,976,476

CHASER-CUTTING MECHANISM

Albert F. Breitenstein, New Haven, Conn., assignor to The Geometric Tool Company, New Haven, Conn., a corporation Application January 28, 1933, Serial No. 653,977

4 Claims. (Cl. 10—154)

This invention relates to an improvement in mechanisms or devices for cutting chasers and relates in particular to mechanisms for cutting or otherwise forming thread-cutting chasers of the so-called "circular" type, i. e., thread-cutting chasers of substantially cylindrical form and having thread-cutting teeth formed upon their peripheries.

Circular chasers as at present in use fall into two distinct classes, namely, those having truly annular thread-cutting teeth upon their peripheries and those having helically-inclined thread-cutting teeth thereon. My invention relates to mechanisms for cutting or otherwise forming the latter type of chasers, which are more fully shown and described in my co-pending application, Serial No. 641,846, filed October 20, 1932, entitled Thread-cutting chasers.

An object of my present invention is to provide a convenient and accurate mechanism for forming helically-inclined thread-cutting teeth or other helically-inclined surfaces upon circular chasers.

A further object of my invention is to provide a mechanism of the class described in which convenient and accurate means is provided for altering the helix angle of the thread-cutting teeth or other helically-inclined surfaces to be formed upon chasers, whereby my improved mechanism is made available for use in the production of a wide variety of chasers.

Other objects and advantages will appear to those skilled in the art from the following, taken in conjunction with the accompanying drawings and the appended claims.

The term "cutter" as used herein is to be understood as including grinding and abrading tools, as well as ordinary cutters, such as mills, etc.

In the accompanying drawings:

Fig. 1 is a top or plan view of one form which a chaser-cutting mechanism embodying my invention may assume, a chaser-blank being shown as mounted, and the parts being shown prior to being set to produce a helical cut;

Fig. 2 is a broken transverse sectional view taken on the line 2—2 of Fig. 1, but on a larger scale;

Fig. 3 is a broken longitudinal sectional view taken on the line 3—3 of Fig. 1, but on a larger scale;

Fig. 4 is a top or plan view corresponding to Fig. 1, but showing the control-bar set for the production of the desired helix angle and the chaser-blank engaged with the threading-hob preparatory to being rotated and moved axially;

Fig. 5 is a broken top or plan view showing the mechanism set for helically milling the outer face of the chaser;

Fig. 6 is a view showing the relative position of the chaser-blank with respect to the end mill as the operation of helically inclining the front face of the blank is at or near completion; and Fig. 7 is a view in side elevation of a chaser as cut by means of my improved mechanism, and having helically-inclined thread-cutting teeth and a helically-inclined front outer face.

The particular mechanism herein chosen as illustrative of the present invention includes a work-holder 20 having a tapered shank 21 and to the outer end of which is adapted to be secured a chaser-blank 22. The means for affixing such a chaser-blank to the work-holder 20 may assume various forms, but as herein shown, the said work-holder is provided with a replaceable stem 23 extending beyond its forward face and entering into the chaser-blank, as clearly shown in Fig. 2, which latter is firmly anchored to it against actual displacement by a screw 24. A pin 25 forwardly offsetting from the work-holder 23 enters an appropriate socket in the rear face of the blank 22 and serves to hold the blank in proper orientation relative to the work-holder.

The work-holder 20 above referred to has its tapered shank 21 internally threaded at its rear end, as at 26, and is seated in a tapered bore 27 formed in a rotary spindle 28 mounted for rotation in a reciprocating spindle-carrier 29, from which it is separated by suitable anti-friction bushings 30. The spindle 28 may be regarded as the primary work-holder and is free, as before stated, for rotary movement within the spindle-carrier 29, but is held against axial movement relative thereto by providing it at the forward end with a flange 31 bearing against the front face of the spindle-carrier 29, and by providing it adjacent the rear end of the said spindle-carrier with a pair of complementary nuts 32 and 33, the former of which is brought to a bearing against the rear face of the said spindle-carrier 29, as clearly shown in Fig. 2.

The spindle 28 is also formed with a rearwardly-extending shank 34 having a bearing in the upstanding arm 35ª of a bracket 35 with capacity for rotary and reciprocating movement therein. Adjacent its extreme rear end, the shank 34 of the spindle 28 has secured to it, by means of a key 36 and a nut 37, a worm-wheel 38 which meshes into and is driven by a worm 39, mounted upon a worm-shaft 40 journaled in a horizontal arm 41, forming a feature of the bracket 35 before referred to. One end of the said worm-shaft 40 has secured to it a hand-wheel 42 by means of which it may be rotated for effecting the rotation of the spindle 28 and also the bodily axial movement thereof, as will hereinafter appear.

The work-holder 20, before referred to, is coupled to the spindle 28 against relative rotary movement by means of a key 43 and has its tapered shank 21 firmly seated in the tapered bore 27 in the spindle 28 by a drawing-bolt 44 having its forward end threaded and engaged with the internal threads 26 in the said shank and having its outer end provided with a polygonal head 45 bearing against the extreme outer end of the shank 34 of the spindle 28.

For the purpose of maintaining the flange 31 of the spindle 28 in engagement with the forward face of the spindle-carrier 29 to thus eliminate any factor of backlash, a helical spring 46 is provided which bears at its rear end against the worm-wheel 38 and at its forward end against a spring-seat 47 which in turn is seated at its forward end against the rear face of the bracket-arm 35ª.

Rigidly keyed to the shank 34 of the spindle 28 intermediate the spindle-carrier 29 and the bracket 35 is a pinion 48 meshing into and driving a rack-bar 49 bolted or otherwise secured to a control-slide 50. The said control-slide 50 fits within an undercut guideway 51 formed in the upper face of a swiveled fixture-frame, generally designated by the numeral 52, and is adapted to reciprocate in the said recess in a horizontal plane in a direction at a right angle to the axis of the spindle 28 and its associated parts.

The fixture-frame 52 above referred to includes an upper member 53 which is rigidly secured by means of bolts 54 to a plate-like member 55 and forms a unitary structure therewith. The member 55 just referred to and hence the member 53 of the fixture-frame 52 are mounted with capacity for swinging movement in a horizontal plane upon the upper surface of a horizontally-reciprocating table 56, by means of a stud 57.

The table 56 just above referred to may form a feature of an ordinary milling machine and, as shown, is mounted with capacity for horizontal reciprocation in a vertically-adjustable slide 58 of such a milling machine.

For the purpose of adjusting the angular position of the swinging fixture-frame 52 with respect to the table 56 which carries it, one end of the member 55 of the said fixture-frame is provided with worm-teeth 59 meshing into a worm 60 rotatably mounted upon the adjacent end of the table 56 and having a knurled turn-button 61, the base of which latter is provided with graduations 62 readable in connection with an index mark 63 inscribed upon the adjacent end of a bracket 64 in which said worm 60 turns. The graduations 62 are spaced to indicate angular measurements in terms of seconds and in conjunction with said graduations the rear end of the said member 55 is adapted to register with either one of two sets of graduations 65 and 66 inscribed upon the upper face of the table 56 and spaced to represent degrees. After the swiveled fixture-frame 52 has been adjusted to the desired angle for the purpose as will hereinafter appear, the same may be firmly clamped in place by clamping-bolts 67—67 extending through slots 68—68 in the member 55 and into the upper face of the table 56.

The table 56 is, as before stated, longitudinally-movable with respect to the vertical slide 58 and for the purpose of effecting such movement and accurately measuring the same, a micrometer-adjuster 69 is provided.

The spindle-carrier 29 is of rectangular exterior form in cross-section, as clearly shown in Fig. 3, and is mounted for reciprocation in a similarly-shaped passage 70 formed in a carrier-housing 71 rigidly secured by bolts 72 to the upper face of the member 53 of the fixture-frame 52. The spindle-carrier 29 is also provided with a depending stud 73 carrying a roller 74 riding in an upwardly-facing groove 75 in a control-bar 76 carried by the control-slide 50 before referred to. The said control-bar 76 is mounted upon the upper surface of the control-slide 50 with capacity for lateral swinging movement with respect thereto by a stud 77 mounted in the said slide 50.

For the purpose of swinging the control-bar 76 laterally and measuring the degree of such movement, I provide the end of the said bar, opposite the stud 77, with worm-teeth 78 meshing into a worm 79 secured to a worm-shaft 80 mounted in a bracket 81 upstanding from and rigidly secured to the upper face of the control-slide 50. The edge 82 of the control-bar 76 is adapted to sweep over a series of degree graduations 83 inscribed upon the adjacent upper surface of the said control-slide, and the rear end of the worm-shaft 80 is provided with a knurled turn-button 84 having graduations 85 inscribed thereon to represent angular minutes and readable in conjunction with an index mark 86 inscribed upon the bracket 81 adjacent the said turn-button, as clearly shown in Figs. 1, 4 and 5. After the control-bar 76 has been adjusted to the desired degree, the same may be firmly locked in place against accidental displacement by complementary clamping-bolts 87—87 extending through slots 88—88 in the said bar and into the upper surface of the control-slide 50.

The longitudinal movement of the control-bar 76 effects the reciprocation of the spindle-carrier 29, spindle 28 and associated parts, and for the purpose of minimizing backlash, a pocket 89 is formed in the carrier-housing 71 directly below the spindle-carrier 29 therein and houses a helical spring 90 bearing at its forward end against the bottom of the said pocket 89 and at its rear end against a lug 91 depending from the said spindle-carrier 29. The said spring 90 exerts a constant effort to maintain the roller 74 in engagement with the rear wall of the upwardly-facing groove 75 in the control-bar 76.

Let it be presumed that it is desired to form helically-inclined cutting-teeth 92 (Fig. 7) upon the chaser-blank 22, and let it further be supposed that the parts of my improved mechanism are in the position in which they are shown in Fig. 1 in which, as well as in Fig. 4, is shown a rotating thread-cutting hob 93, adapted to be driven from any convenient source of power and, as shown, mounted in a rotary spindle 94 forming a feature of any approved type of machine such, for instance, as a milling machine.

The clamping-bolts 87—87 are now loosened and the turn-button 84 is appropriately turned until the control-bar 76 has been inclined with respect to the control-slide 50 to the desired degree.

The table 56, together with the parts carried thereby, is now moved from right to left as viewed in Figs. 1, 4 and 5, until the cutting-teeth of the said hob have penetrated into the blank the desired distance. This adjustment of the table 56 and associated parts is effected by means of the micrometer-adjuster 69.

The hand-wheel 42 is now rotated so as to turn the spindle 28 with the effect also of causing the pinion 48, carried by the said spindle, to act through the rack-bar 49 and longitudinally move the control-slide 50 from left to right as viewed in the drawings. As the spindle is being rotated and the control-slide 50 is being moved longitudinally, as just described, the control-bar 76 is being correspondingly moved longitudinally with the effect of causing the said control-bar to act through the roller 74 and stud 73 to advance the spindle-carrier 29 and hence similarly move the spindle 28 and hence also the chaser-blank 22. Thus, the spindle 28 is rotated and simultaneously moved axially at a predetermined relative ratio, which ratio is determined by the inclination of the control-bar 76 with respect to the control-slide 50 upon which it is pivotally mounted.

The combined rotation and axial movement of the spindle and hence of the blank 22 results in the formation of helically-inclined cutting-teeth 92 upon the periphery of the blank.

As shown in Fig. 4 for instance, the control-bar 76 has its free end displaced rearwardly so that the combined rotary and axial movement of the spindle 28, as above described, will produce left-hand thread-cutting teeth upon the blank. If, however, it is desired to cut right-hand helically-inclined thread-cutting teeth upon the blank, the free end of the control-bar 76 may be displaced forwardly to thus cause the spindle 28 to move axially rearwardly at the same time it is rotated, rather than forwardly as required for the production of left-hand cutting-teeth on the blank.

Should it be desired to helically cut the front face of the chaser-blank, this operation may also be accomplished with my improved mechanism by replacing the thread-cutting hob 93 with an end-milling cutter 95 (Figs. 5 and 6). Under these circumstances, it is desirable to first cant the fixture-carrying frame with respect to the cutter, so as to insure the proper angular contact of the end of the cutter 95 with the face of the chaser-blank.

To effect this angular adjustment of the fixture-frame and the parts carried thereby, the clamping-bolts 67—67 are loosened and the turn-button 61 appropriately turned to swing the fixture-frame 52 into the desired position, such, for instance, as that shown in Figs. 5 and 6. The table 56 may now be longitudinally adjusted to properly position the blank with respect to the cutter. Now upon rotation of the hand-wheel 42, the spindle 28 and hence the chaser-blank 22 will be simultaneously rotated and moved axially as required to produce a helically-inclined front face 96 (Figs. 6 and 7) upon the blank 22. The helix angle of the cut made upon the front face of the chaser, as just described, may be determined by suitably adjusting the control-bar 76 with respect to the control-slide 50 in the same manner as that already described in connection with the formation of peripheral thread-cutting teeth upon the blank.

In the foregoing description, I have described my invention as employed for cutting both peripheral thread-cutting teeth and helically-inclined chaser-faces and it is to be understood that my improved mechanism is also available for grinding operations, such, for instance, as in finishing thread-cutting teeth 92 or finishing the helically-inclined front face 96 of the chaser-blank.

By means of my improved chaser-cutting mechanism, I am enabled to produce a wide variety of circular chasers, since, by merely changing the inclination of the control-bar 76 of the helical cuts, a wide variety of helical cuts, etc., may be accurately and conveniently formed.

The invention may be carried out in other specific ways than that herein set forth, without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. In a chaser-cutting mechanism, the combination with a rotary cutter; of a fixture-frame swingable transversely of the axis of the said cutter; work-holding means mounted on the said fixture-frame with capacity for both rotation and reciprocation with respect to the said cutter; and operating means for simultaneously rotating and reciprocating the said work-holding means independently of the said cutter and proportioning the said movements with respect to each other in predetermined ratios, including a pivotal and reciprocatable control-bar also carried by the said fixture-frame and movable transversely with respect to the axis of the said work-holding means and operatively connected thereto for axially moving the same.

2. In a chaser-cutting mechanism, the combination with a cutter; of a reciprocating table; a pivotal fixture-frame carried by the said table; a control-slide carried by the said fixture-frame with capacity for reciprocation with respect thereto; work-holding means carried by the said fixture-frame with capacity for both rotation and reciprocation with respect to the said cutter; means carried by the said control-slide for operatively interconnecting the latter to the said work-holding means to insure the concurrent proportional movement of the said control-slide and the said work-holding means; and a pivotal control-bar also carried by the said control-slide and movable both with and independently with respect thereto and operatively connected to the said work-holding means for axially moving the same; whereby the said work-holding means may be canted with respect to the said cutter without disturbing the setting of the said control-bar with respect to the said work-holding means.

3. In a chaser-cutting mechanism, the combination with a cutter; of a fixture-frame; a support for the said fixture-frame; a control-slide carried by the said fixture-frame with capacity for reciprocation with respect thereto; work-holding means carried by the said fixture-frame and connected thereto with capacity for both rotation and reciprocation with respect to the said cutter; means carried by the said control-slide for operatively interconnecting the latter to the said work-holding means to insure the concurrent proportional movement of the said control-slide and the said work-holding means; a pivotal control-bar also carried by the said control-slide and operatively connected to the said work-holding means for axially moving the same; the aforesaid fixture-frame being carried by the said support with capacity for pivotal movement with respect thereto to concurrently cant the said control-slide and work-holding means with respect to the said cutter.

4. In a chaser-cutting mechanism, the combination with a rotary cutter; of a fixture-frame; a support for the said fixture-frame; a control-slide carried by the said fixture-frame with capacity for reciprocation with respect thereto; a spindle-carrier carried by the said fixture-frame with capacity for reciprocation with respect thereto; a work-holding spindle carried by the said spindle-carrier with capacity for rotation with respect thereto; a pinion carried by the said spindle; a rack carried by the said control-slide and meshed with the said pinion for operatively interconnecting the said spindle and the said control-slide to insure the concurrent proportional movement of the said control-slide and the said work-holding means; a pivotal control-bar also carried by the said control-slide and operatively connected to the said spindle-carrier for axially moving the same; the aforesaid fixture-frame being carried by the said support with capacity for pivotal movement with respect thereto to thus effect the concurrent inclination, with respect to the said cutter, of the said work-holding spindle, spindle-carrier, control-slide, and parts carried by the latter.

ALBERT F. BREITENSTEIN.